Patented July 6, 1937

2,085,795

UNITED STATES PATENT OFFICE 2,085,795

DYEING AND MORDANT THEREFOR

Raymond L. Drew, Arlington, and Wallace S. Peck, Belleville, N. J., assignors to American Dyewood Company, New York, N. Y., a corporation of Pennsylvania No Drawing. Application January 30, 1936, Serial No. 61,576

10 Claims. (Cl. 8—5)

This invention relates to the treatment of organic esters of cellulose or mixtures containing such esters in the form of fibres, yarns, and woven or knitted fabrics, to fix therein iron compounds which are adapted to combine with natural or vegetable dyes, acting as a mordant to ensure a satisfactory dyeing of the material. The invention is applicable particularly to the treatment of cellulose acetate ("celanese"), but it may be used similarly in treating other artificial fibres such as nitrocellulose, cuprammonium and viscose, and mixtures containing these fibres.

Artificial fibres of cellulose esters have replaced natural silk to a very large extent, and the substitution is still rapidly expanding. Logwood and other vegetable dyes such as fustic, quebracho, etc., are widely used as dyes for silk, but have not been used successfully with artificial fibres, particularly cellulose acetate material, because these dyes have little or no affinity for such fibres. The natural dyes have numerous advantages, when they can be applied successfully, in respect to color and the feel or "hand" of the finished fabric.

It has been suggested heretofore that organic cellulose fibres can be dyed successfully with logwood by initially treating the material in a highly concentrated solution of ferric chloride, that is, a solution containing 40–55% by weight. We have found, however, that the time required for treatment and the relatively high temperature necessary for successful results tend to weaken the material treated. The concentrated ferric chloride solution is also destructive to dye-house equipment. Moreover, the ferric chloride solution is effective only when freshly prepared. When the solution is permitted to stand for comparatively brief periods and particularly if an attempt is made to use such solutions from day to day as in ordinary dyeing practice, the effect is negligible, and the operation is unsuccessful. Evidently changes occur in the solution which prevent any substantial fixation of iron in the fibres. In the absence of iron, logwood will not dye the material satisfactorily.

It is the object of the present invention to avoid the difficulties heretofore experienced in applying logwood and other similar natural dyes to organic esters of cellulose and especially to provide a simple and effective method of treating such materials and a mordant which will ensure the production of satisfactory results.

Another object of the invention is the provision of a method of preparing a mordant of iron compounds which can be fixed readily and effectively in fibres of organic esters of cellulose.

A further object of the invention is the provision of a method of applying vegetable dye such as logwood and the like to cellulose acetate and other organic esters of cellulose and mixtures thereof.

We have discovered that an effective mordant can be prepared from water solutions of iron salts by hydrolyzing such solutions. The application of heat for a sufficient time will tend to produce the desired hydrolysis. Other methods of effecting hydrolysis may be employed. The desired result is accomplished more rapidly and satisfactorily by the addition of suitable alkaline agents with or without other combining agents for the acid released by hydrolysis. We do not wish to be bound by any particular theory, but we believe that the phenomenon described is due to the formation of hydrous oxides of iron in the solution, which may be in colloidal or semi-colloidal condition, for example, a ferric oxide sol peptized by ferric chloride. In other words, there is an equilibrium condition in which the hydrous oxide remains substantially in suspension in the solution. Whatever theory is adopted, a mordant prepared as hereinafter described is a brownish liquid of milky consistency. The material to be dyed is immersed in this liquid for a brief period, i. e., 10–15 minutes or longer if desired. Sufficient iron is fixed so that it will combine with the hematoxylin of logwood, for example, to practically dye the material. Submersion of the material for 30 minutes will fix 0.7% of iron expressed as $Fe_2O_3$ (0.488 Fe) in the material, an amount which is ample for the purpose. After the mordanting operation, the material is washed and dyed in the usual manner.

In the practical application of the invention, we prefer to employ ferric chloride or ferric nitrate as the starting material. Other iron salts may be used. For example, though not necessarily so effective, ferric citrate, ferric phosphate, ferric sulphate, ferric tartrate, ferric oxalate, and ferrous lactate may replace all or a part of the ferric chloride or ferric nitrate.

We also prefer, as hereinbefore indicated, to accelerate the hydrolysis. For that purpose we may employ the hydroxides or carbonates of the alkali metals potassium and sodium, or ammonium hydroxide. Hydroxides of the alkaline earth metals can also be used but are not desirable because they affect the color of the dye. Iron powder can also be used as a neutralizing agent.

It is also desirable, though not essential, to add an agent such as sodium acetate to combine with hydrochloric acid released during the hydrolysis, thereby lessening the corrosive effect on the equipment. Other agents which may be used for this purpose are potassium acetate, sodium or potassium phosphate, sodium or potassium oxalate, sodium or potassium formate, sodium or potassium lactate, and sodium or potassium citrate.

In general, it is desirable to start with a solution containing from about 5% to about 20% of ferric chloride or equivalent iron compound by weight, and to add thereto a solution of an hydroxide or carbonate of alkali metal or ammonia in amount sufficient to neutralize from 25% to 50% of the ferric chloride or equivalent iron compound. The proportions are not critical and may be varied somewhat from the ranges mentioned which, however, are those best adapted for the accomplishment of the purpose.

The addition of the neutralizing agent produces a gelatinous precipitate. The solution is then heated to a temperature of at least 60° C. and up to the boiling point. As the heating proceeds, the precipitate dissolves in the unneutralized ferric chloride, and at the higher temperature the material hydrolyzes to produce the desired ferric oxide sol. To obtain the best results, it is necessary to raise the temperature at such speed and to stir the material so that all of the gelatinous hydrous ferric oxide dissolves before hydrolysis takes place. Heating is continued until by evaporation the volume is considerably reduced, preferably to about one-half of the original volume. When evaporation is completed, the material will be approximately 25° Bé.

As hereinbefore indicated, substantially better results are secured if in addition to the alkali which is added to precipitate the gelatinous hydrous ferric oxide, a substantial amount of sodium acetate or equivalent agent is added to combine with hydrochloric acid. This addition is made before or after the solution is heated. Otherwise the procedure is the same.

As an example of a satisfactory procedure, we dissolve 1250 kilos of anhydrous ferric chloride in 12000 liters of water. This solution is neutralized with 270 kilos of caustic soda or the equivalent amount on a molecular basis of other neutralizing agent. The solution is heated, as hereinbefore described, with suitable precautions to ensure the solution of the gelatinous hydrous ferric oxide, and is evaporated to about 6000 liters. Preferably before heating, we add 360 kilos of sodium acetate to combine with the hydrochloric acid released. The foregoing, it will be observed, is merely an example illustrating the preferred procedure in preparing the mordant, which procedure is subject to numerous variations as previously described.

It is possible to prepare a suitable mordant also including a negative sol instead of the positive sol as hereinbefore described. The negative sol is prepared by the addition of glycerine or sugars to the ferric chloride solution before or after the addition of the alkali. As a typical example, we may dissolve 250 grams of ferric chloride in 3 liters of water, adding thereto 20 grams of cane sugar and 54 cc. of ammonium hydroxide, specific gravity 0.9. This solution is then heated with the precautions hereinbefore mentioned and evaporated to about 1 liter. Similar proportions can be followed in preparing a bath of large volume as in the previous example. In place of cane sugar, we have used glucose, glycerine, corn syrup (Karo) and molasses.

The method of utilizing the mordant and the dyeing operation are similar to those used generally in the textile dyeing industry. The details of such operations can obviously be varied widely. We shall, however, describe the ordinary procedure.

After the goods have been scoured with the usual scouring agents or boiled off in caustic alkali, as is the common practice in the textile industry, they are passed through the mordant bath prepared in accordance with our invention. The mordant bath may be in the conventional open box overhead reel dye winch. The temperature and the time may be varied. It is usually satisfactory to turn the material on the reel for approximately 40 minutes while the bath is at a temperature of 50° C. This will deposit in the fibre approximately 0.7% iron expressed as $Fe_2O_3$. An iron deposit of from 0.5% to 1.0% is entirely satisfactory for the dyeing operation, and under the conditions mentioned this amount will always be deposited.

The material is then passed through a set of rollers to remove the excess mordant, which drains back into the box thereby decreasing the consumption of the mordant and reducing the cost of the operation. The material is then washed by the conventional method familiar in the textile industry. Though not essential, it is desirable to then pass the material through a cold or warm dilute solution (½%) of sodium carbonate. This treatment gives additional stability toward bleeding.

The material has now fixed in it the necessary quantity of iron. This iron cannot be removed, even by long and vigorous washing. Our tests have shown that during the first minute or so of washing the surplus iron is removed to the point indicated, that is to say, somewhat less than 1.0%, and that further washing does not reduce the amount of iron even under vigorous action. The first washing evidently removes the superficial or surface iron, the balance being permanently fixed in the fibre.

The material, after the treatment described, is passed to the dyeing winch. The operation is carried out as for ordinary dyestuffs, using in the bath from 1% to 3% of logwood, toned, if desired, with fustic to give the desired shade. The material can be dyed from a neutral or slightly acid solution or in the presence of wetting out agents, if desired. Variations may be made as in the usual practice to adjust the shade or feel of the material. Other natural dyestuffs can be utilized in a similar manner. The usual time for dyeing is approximately one hour. Our experience indicates that the heaviest blacks can be obtained satisfactorily in that time. The goods are then finished by the conventional processes of the textile industry.

The dyeing operation as hereinbefore described relates more particularly to mixed goods, crepes and materials which can be handled in the open box. Certain classes of materials, such as those made from straight "celanese" such as satins and certain classes of flat goods, must be handled in the jigger or machine which is capable of holding tension on the cloth, thereby preventing wrinkles and creases. The mordant bath can be applied in the jigger as well as in the open box and reel, and the dyeing operation can be conducted in similar apparatus.

Among the particular advantages of the invention are low cost of operation. The present method of dyeing materials containing cellulose esters employs expensive dyestuffs which are in reality very finely dispersed pigments incorporated in the fabric by the aid of oils and softening agents. The usual procedure requires from 5 to 6 hours, whereas as hereinbefore indicated the time required in accordance with our method is materially shortened. Another advantage is that the fabric is given that very desirable logwood shade with which the silk industry has long been familiar. Another advantage is that mixed goods can be dyed in a single operation, since the mordant causes the dye to act similarly and simultaneously on different fibres. No addition of other agents is necessary in treating mixed goods. It is not necessary to dye first one fibre and then the other, thus duplicating the operations as is the common practice today. One mordant and one dye are employed to effect the dyeing of different fibres in a single operation.

While we have described certain preferred procedures and specific examples of the operation, it is to be understood that our invention is not thereby limited. It depends upon the application to the material treated of the hydrolyzed iron compound which penetrates and is fixed to the fibre and thus affords a proper basis for natural dyestuffs such as logwood. The mordant as indicated may be prepared in various ways, any of which produce the peptized ferric oxide sol or its equivalent.

Various changes may be made, therefore, in the procedure and particularly the details thereof without departing from the invention or sacrificing any of the advantages thereof.

We claim:

1. The method of preparing a mordant in preparation for dyeing materials with logwood and like natural dyes which comprises partially neutralizing a water solution of an iron salt to form ferric hydroxide and heating the solution to facilitate hydrolysis of the iron salt and colloidally disperse the formed ferric hydroxide.

2. The method of preparing a mordant in preparation for dyeing materials with logwood and like natural dyes which comprises partially neutralizing a water solution of ferric chloride to form ferric hydroxide and heating the solution to facilitate hydrolysis of the ferric chloride and colloidally disperse the formed ferric hydroxide.

3. The method of preparing a mordant in preparation for dyeing materials with logwood and like natural dyes which comprises partially neutralizing a water solution of an iron salt to form ferric hydroxide and adding an agent capable of reacting with acid set free by hydrolysis, the solution being heated to facilitate hydrolysis and colloidally disperse the formed ferric hydroxide.

4. The method of preparing a mordant in preparation for dyeing materials with logwood and like natural dyes which comprises partially neutralizing a water solution of ferric chloride to form ferric hydroxide and adding an agent capable of reacting with acid set free by hydrolysis, the solution being heated to facilitate hydrolysis and colloidally disperse the formed ferric hydroxide.

5. The method of dyeing materials which comprises treating the materials with a mordant bath comprising a colloidal suspension of hydrous ferric oxide produced by partially neutralizing a water solution of an iron salt, said solution having been heated to facilitate hydrolysis and to colloidally disperse the formed ferric hydroxide, and then dyeing the materials with a natural vegetable dye.

6. The method of dyeing materials which comprises treating the materials with a mordant bath comprising a colloidal suspension of hydrous ferric oxide produced by partially neutralizing a water solution of ferric chloride, said solution having been heated to facilitate hydrolysis and to colloidally disperse the formed ferric hydroxide, and then dyeing the materials with a natural vegetable dye.

7. The method of dyeing materials which comprises treating the materials with a mordant bath comprising a colloidal suspension of hydrous ferric oxide produced by partially neutralizing a water solution of an iron salt, said solution having had added thereto an agent capable of reacting with acid set free by hydrolysis of the iron salt and having been heated to facilitate hydrolysis and to colloidally disperse the formed ferric hydroxide, and then dyeing the materials with a natural vegetable dye.

8. The method of dyeing materials which comprises treating the materials with a mordant bath comprising a colloidal suspension of hydrous ferric oxide produced by partially neutralizing a water solution of ferric chloride, said solution having had added thereto an agent capable of reacting with acid set free by hydrolysis of the iron salt and having been heated to facilitate hydrolysis and to colloidally disperse the formed ferric hydroxide and then dyeing the materials with logwood.

9. The method of preparing materials for dyeing which comprises treating the materials with a mordant bath comprising a colloidal suspension of hydrous ferric oxide produced by partially neutralizing a water solution of an iron salt, said solution having been heated to facilitate hydrolysis and to colloidally disperse the formed ferric hydroxide.

10. The method of preparing materials for dyeing which comprises treating the materials with a mordant bath comprising a colloidal suspension of hydrous ferric oxide produced by partially neutralizing a water solution of ferric chloride, said solution having had added thereto an agent capable of reacting with acid set free by hydrolysis of the iron salt and having been heated to facilitate hydrolysis and to colloidally disperse the formed ferric hydroxide.

RAYMOND L. DREW.
WALLACE S. PECK.